United States Patent
Lim et al.

(10) Patent No.: US 6,549,020 B2
(45) Date of Patent: Apr. 15, 2003

(54) CARTRIDGE SCREENING TECHNIQUE BY USING THE ELECTRICAL DYNAMIC BEARING RESISTANCE

(75) Inventors: Eng Hock Lim, Singapore (SG); Quek Leong Choo, Singapore (SG); Myint Ngwe, Singapore (SG); Kah Liang Gan, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/792,884

(22) Filed: Feb. 23, 2001

(65) Prior Publication Data

US 2001/0033173 A1 Oct. 25, 2001

Related U.S. Application Data (60) Provisional application No. 60/184,700, filed on Feb. 24, 2000.

(51) Int. Cl.$^7$ .............................................. G01R 27/08
(52) U.S. Cl. ...................................... 324/701; 73/865.9
(58) Field of Search ................................ 324/523, 701, 324/511, 513, 525; 73/865.9

(56) References Cited

U.S. PATENT DOCUMENTS

| | | | |
|---|---|---|---|
| 4,488,689 A | 12/1984 | Councilman | 242/84.5 |
| 4,796,828 A | 1/1989 | Councilman | 242/84.5 |
| 5,008,081 A | 4/1991 | Blau et al. | 422/64 |
| 5,305,169 A | 4/1994 | Anderson et al. | 360/105 |
| 5,430,590 A | 7/1995 | Ainslie et al. | 360/98.07 |
| 5,757,582 A * | 5/1998 | White et al. | 360/98.01 |

* cited by examiner

*Primary Examiner*—N. Le
*Assistant Examiner*—Etienne P LeRoux (57) ABSTRACT

A method for characterizing a bearing cartridge based on a preload applied to the bearing cartridge used in a disc drive, to increase disc drive yield rates. The method begins by loading the bearing cartridge on to a test fixture and to an actuator assembly such that the actuator is rotatably attached to the base by the bearing cartridge. Then, the method includes inducing a steady swing in the actuator. Then, the method includes measuring a voltage drop that occurs across the bearing cartridge during the steady swing to characterize the preload applied to the bearing cartridge.

20 Claims, 9 Drawing Sheets

CARTRIDGE SCREENING TECHNIQUE BY USING THE ELECTRICAL DYNAMIC BEARING RESISTANCE

RELATED APPLICATION

This application claims the benefit of U.S. Provisional Application Serial No. 60/184,700, filed Feb. 24, 2000 under 35 U.S.C. 119(e).

FIELD OF THE INVENTION

The present invention relates to the field of mass storage devices. More particularly, this invention relates to a method and apparatus for screening disc drives to improve disc drive yield rates.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface (ABS) which includes rails and a cavity between the rails. When the disc rotates (generally, at rotational speeds of 5,400 RPM or higher), air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring, which produces a force on the slider directed toward the disc surface. The various forces on the slider equilibrate, so that the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also required to be moved to a target track. As the storage disc spins and the read/write head is accurately positioned above a target track, the read/write head can store data onto a track by writing data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, one track on one side of the disc drive is a continuous spiral. Each track on a disc surface in a disc drive is further divided into a number of short arcs called sectors. Servo feedback information is used to accurately locate the transducer head onto the tracks/sectors. The actuator assembly is moved to the required position and held very accurately during a read or write operation using the servo information.

The actuator assembly is composed of many parts that contribute to the performance required to accurately hold the read/write head in the proper position. There are two general types of actuator assemblies, a linear actuator and a rotary actuator. The rotary actuator includes a pivot assembly, an arm, a voice coil yoke assembly, and a head gimbal suspension assembly. The rotary actuator assembly pivots or rotates to reposition the transducer head over particular tracks on a disk. A suspension or load beam is part of the head gimbal suspension assembly. The rotary actuator assembly also includes a main body, which includes a shaft and bearing about which the rotary actuator assembly pivots. Attached to the main body are one or more arms. One or typically two head gimbal suspension assemblies are attached to the arm.

The actuator assembly is rotatably attached to a shaft via a bearing cartridge, which generally includes one or more sets of ball bearings. The shaft/post is attached to the base and may be attached to the top cover of the disc drive. A yoke is attached to the actuator assembly. The voice coil is attached to the yoke at one end of the rotary actuator assembly. The voice coil is part of a voice coil motor, which is used to rotate the actuator assembly including the attached transducer or transducers. A permanent magnet is attached to the base and cover of the disc drive. The voice coil motor, which drives the rotary actuator assembly, comprises the voice coil and the permanent magnet. The voice coil is attached to the rotary actuator assembly and the permanent magnet is fixed on the base. A yoke is generally used to attach the permanent magnet to the base and to direct the flux of the permanent magnet. Since the voice coil is sandwiched between the magnet and yoke assembly and is subjected to magnetic fields, electricity can be applied to the voice coil to drive it so as to position the transducers at a target track.

Tribological (mechanical resistance) characterization of the head-disc interface (head-actuator-arm-shaft-bearing cartridge) is generally critical to final qualification of both the shaft-bearing cartridges during the assembly operations of the disc drive. This is because the bearing cartridge is the only dynamic structure positioned between the actuator arm assembly and the base and further the bearing cartridge is the only dynamic structure holding the actuator arm assembly and the base in a disc drive. Generally, a lower preload applied between the bearing cartridge and the shaft causes lower mechanical resistance (axial mode resonance occurs at low axial mode frequency) and a higher preload applied between the bearing cartridge and the shaft causes higher mechanical resistance (axial mode resonance occurs at high axial mode frequency). Lower preload can cause seeking and settling problems and can affect the drive error rate performance, because lower preload generally introduces noise humps (in the range of 60–100 MHz) in the actuator arm during seeking, which can cause seeking and settling problems.

Current methods to characterize the preload applied to the bearing cartridge use a laser beam to shine on the cartridge during the seek operation to determine the generated axial mode frequency. The implementation of a laser beam method in a manufacturing environment generally needs sophisticated and elaborate calibration procedures. Also, the laser beam method requires expensive set-up and is generally very time consuming and not suitable for application in the manufacturing environment.

What is needed is a simpler, easier to set up, and less expensive method and apparatus to characterize the bearing cartridge based on the preload applied to the bearing cartridge in a manufacturing environment, to increase disc drive yield rates.

SUMMARY OF THE INVENTION

A method for characterizing a bearing cartridge based on a preload applied to the bearing cartridge used in a disc drive, to increase disc drive yield rates. The method begins with the step of loading the bearing cartridge on to a test fixture including a base and a voice coil motor-shaft-actuator assembly such that the voice coil motor-shaft-bearing cartridge-actuator assembly is rotatably attached to the base. Then, the method includes applying a voltage signal onto the voice coil motor to provide a steady swing to the actuator assembly including the shaft and the bearing cartridge. Then, the method includes measuring a voltage drop that occurs across the bearing cartridge during the steady swing of the actuator assembly to characterize the preload applied to the bearing cartridge. Then, the method further includes comparing the measured voltage drop with a predetermined threshold value to characterize the bearing cartridge.

Also discussed is a test fixture that includes a base, a voice coil motor-shaft-actuator assembly, and a bearing cartridge disposed between the shaft and the actuator assembly. The voice coil motor-shaft-bearing cartridge-actuator assembly is rotatably attached to the base. The test fixture can also include voice coil motor circuitry to apply a voltage signal to the voice coil motor to induce a steady swing of the actuator assembly. Further, the text fixture can include voltage divider circuitry to measure a voltage drop across the bearing cartridge during the steady swing to characterize the bearing cartridge based on the preload applied to the bearing cartridge to reduce seeking and settling problems during a seek operation and to increase disc drive yield rates during manufacturing.

Advantageously, the method and apparatus described above provides a simpler, a more easier to set up, and a less expensive method and apparatus to characterize the bearing cartridge based on the preload applied to the bearing cartridge in a disc drive during manufacturing, to increase disc drive yield rates.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
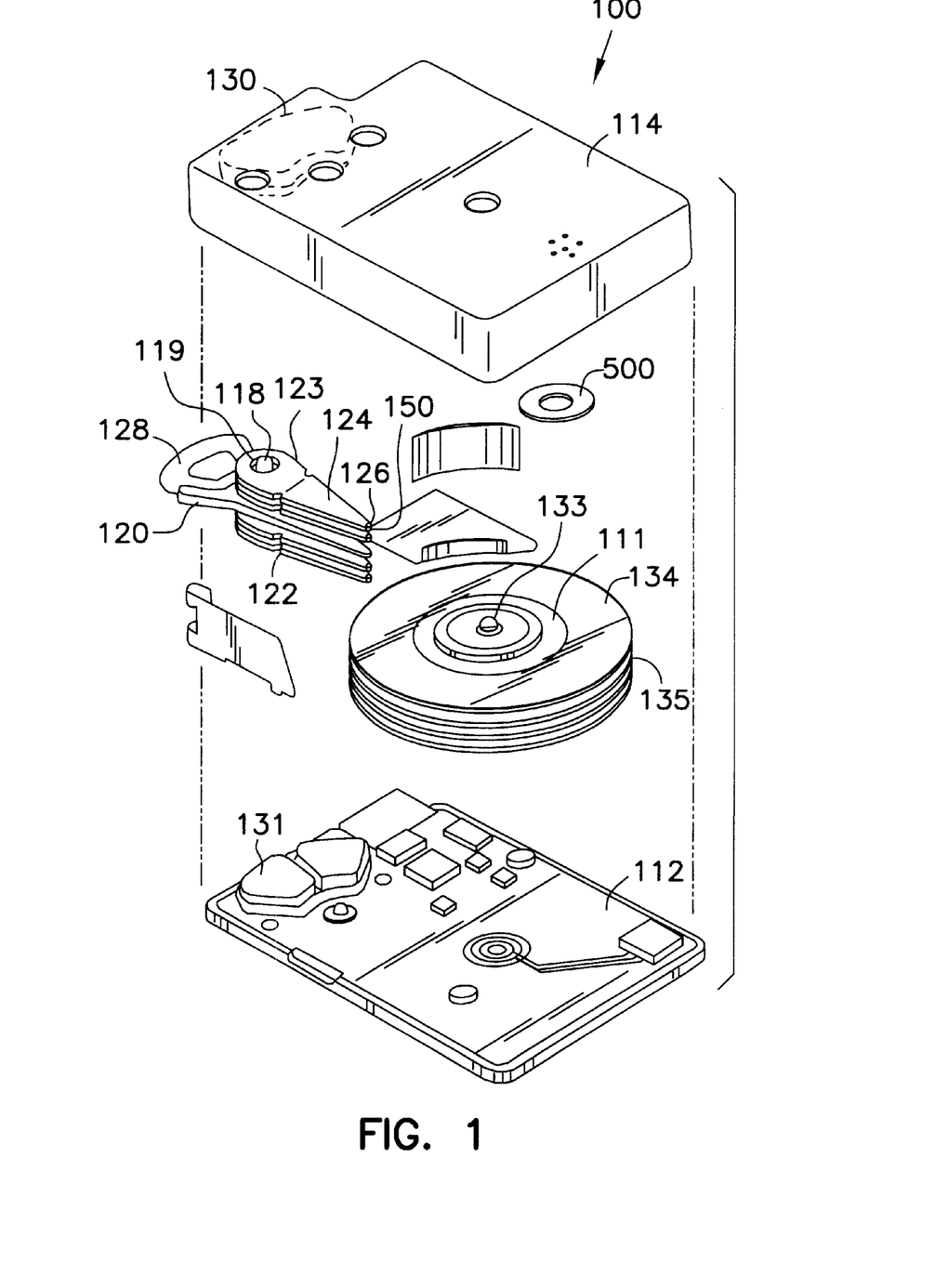
FIG. 1 is an exploded view of a disc drive with a multiple disc stack.

FIG. 1 is an exploded view of one type of a disc drive 100 having a rotary actuator. The disc drive 100 includes a housing or a base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of actuator arms 123. Attached to the separate arms 123 on the comb 122, are load beams or load springs 124. Load beams or load springs are also referred to as suspensions. Attached at the end of each load spring 124 is a slider 126, which carries a magnetic transducer 150. The slider 126 with the transducer 150 form what is often called the head. The head with the load spring 124 is often called the head gimbal assembly. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the first magnet 130 is associated with the cover 114 and the second magnet 131 is associated with the base 112. The first and second magnets 130, 131, and the voice coil 128 are the key components of a voice coil motor, which applies a force to the actuator assembly 120 to rotate it about the actuator shaft 118 and the bearing cartridge 119. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a recording surface 135. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 133 or under the hub.

Figure 2:
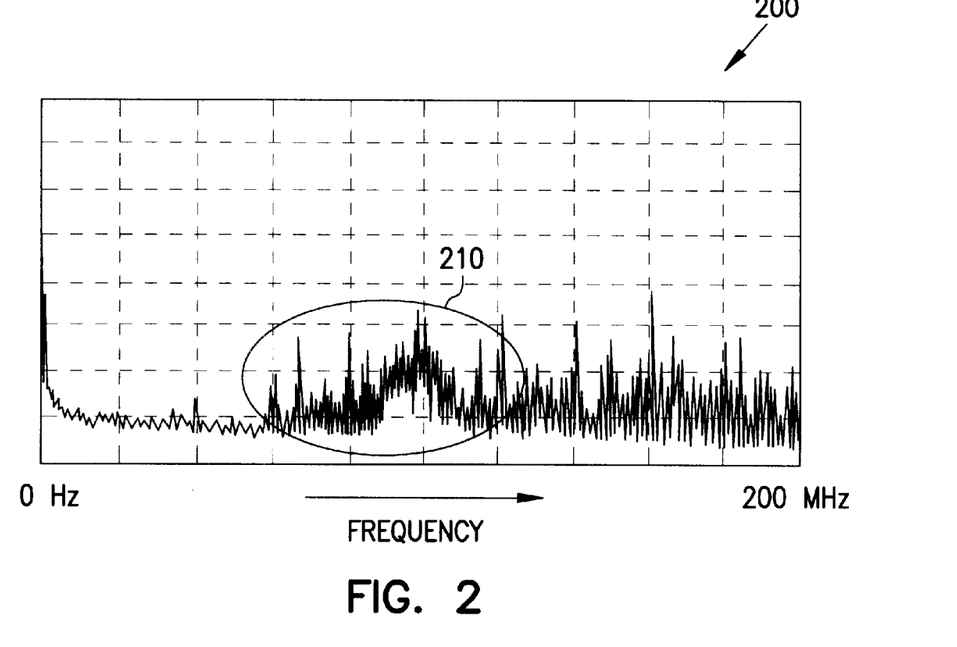
FIG. 2 is a low frequency spectrum illustrating generated noise humps in a low-preload bearing cartridge.

FIG. 2 illustrates a low frequency noise spectrum 200 for a disc drive including a low-preload bearing cartridge. It can be seen from the noise spectrum 200 that the noise humps 210 tend to increase significantly in frequency range around 60 MHz–100 MHz. These noise humps (around 60 MHz–100 MHz) can significantly affect the drive error rate and can increase the seeking and settling problems in the actuator arm during a seek operation of the disc drive.

Figure 3:
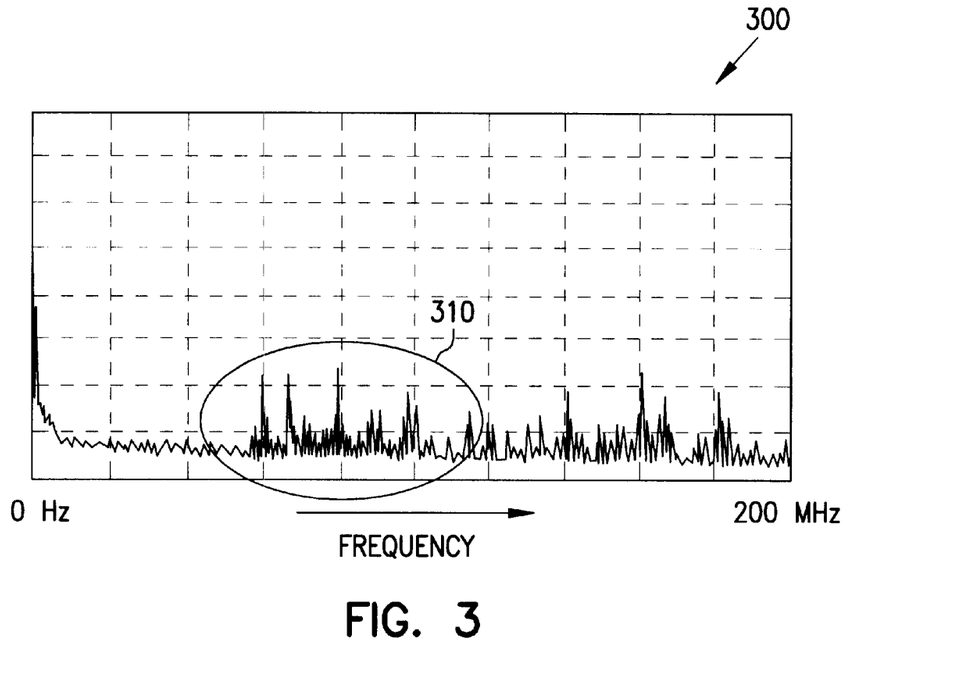
FIG. 3 is a low frequency spectrum illustrating generated noise humps in a normal-preload bearing cartridge.

FIG. 3 illustrates a low frequency noise spectrum 300 for a disc drive including a normal preload bearing cartridge. It can be seen from this noise spectrum 300 that the noise humps 310 around 60 MHz–100 MHz are significantly less in amplitude when compared with the amplitude of the noise humps 210 around 60 MHz–100 MHz shown in FIG. 2 for a low-preload bearing cartridge. Therefore, by characterizing and screening bearing cartridges based on the preload applied to the bearing cartridges used in the disc drives, the disc drive yield rates can be significantly increased.

Figure 4:
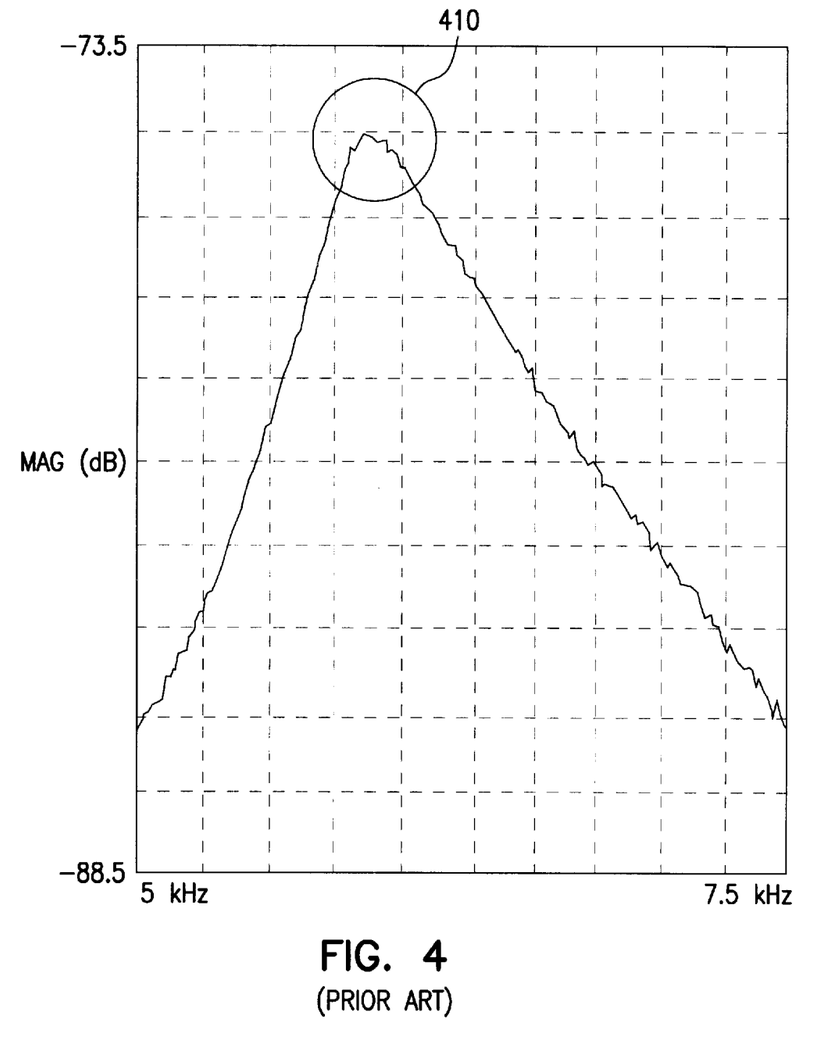
FIG. 4 illustrates a graph of axial mode resonance versus axial mode frequency measured using a laser beam method for a low-preload bearing cartridge.
Figure 5:
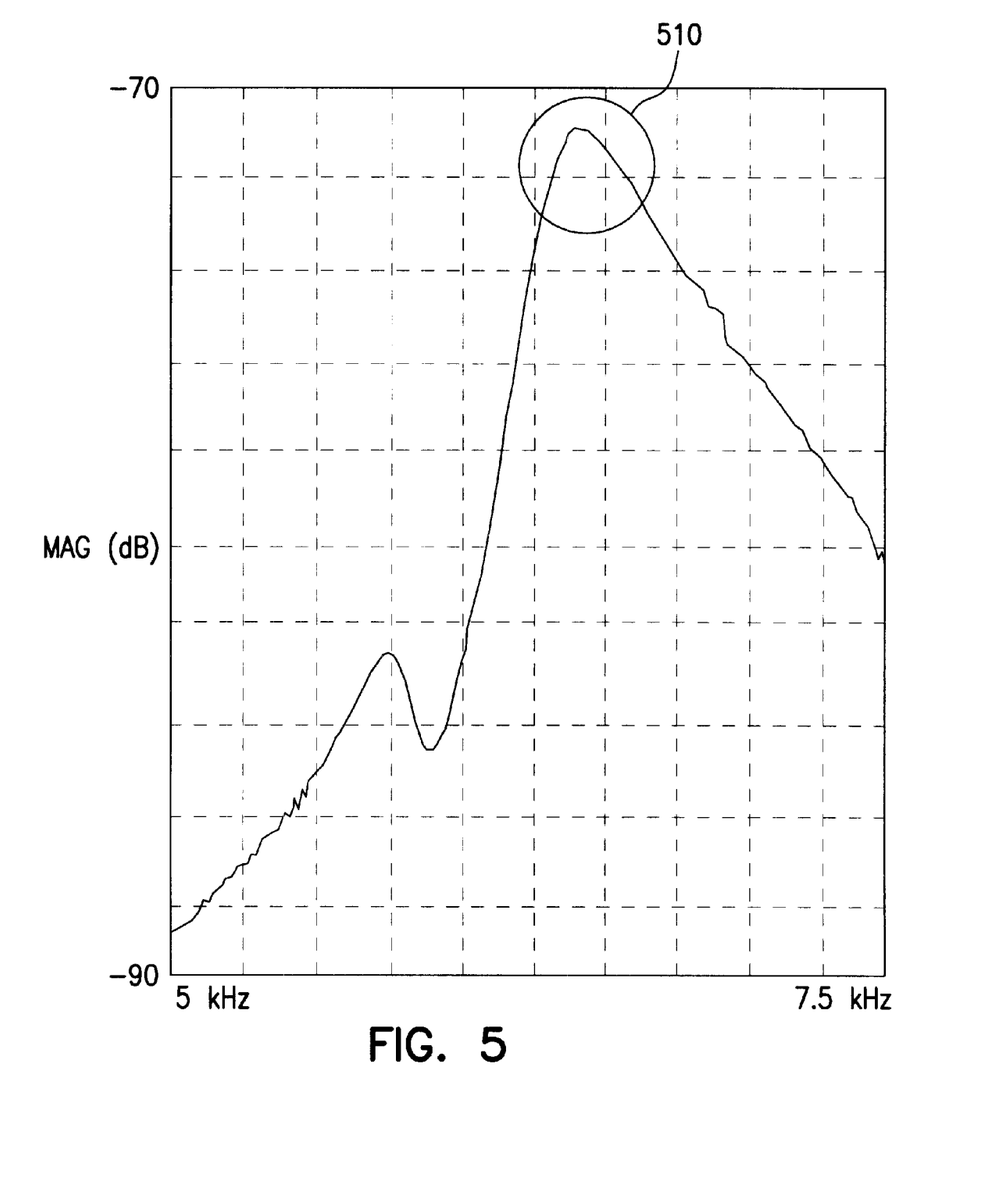
FIG. 5 illustrates a graph of axial mode resonance versus axial mode frequency measured using a laser beam method for a normal bearing cartridge.

FIG. 4 illustrates one embodiment of a graph of axial mode resonance versus axial mode frequency measured using the prior art laser beam method for screening a low-preload bearing cartridge. FIG. 5 illustrates another embodiment of a graph of axial mode resonance versus axial mode frequency measured using a prior art laser beam method for a bearing cartridge having normal preload. It can be seen from FIGS. 4 & 5 that the axial mode resonance peaks 410 at about 5.8 kHz, for the bearing cartridge having low-preload, whereas the axial mode resonance for a bearing cartridge having normal preload peaks 510 at about 6.4 kHz, respectively. Generally, the peak of the axial mode resonance frequency should be larger than 6.1 kHz for the bearing cartridge to be acceptable to be used in a disc drive.

Figure 6:
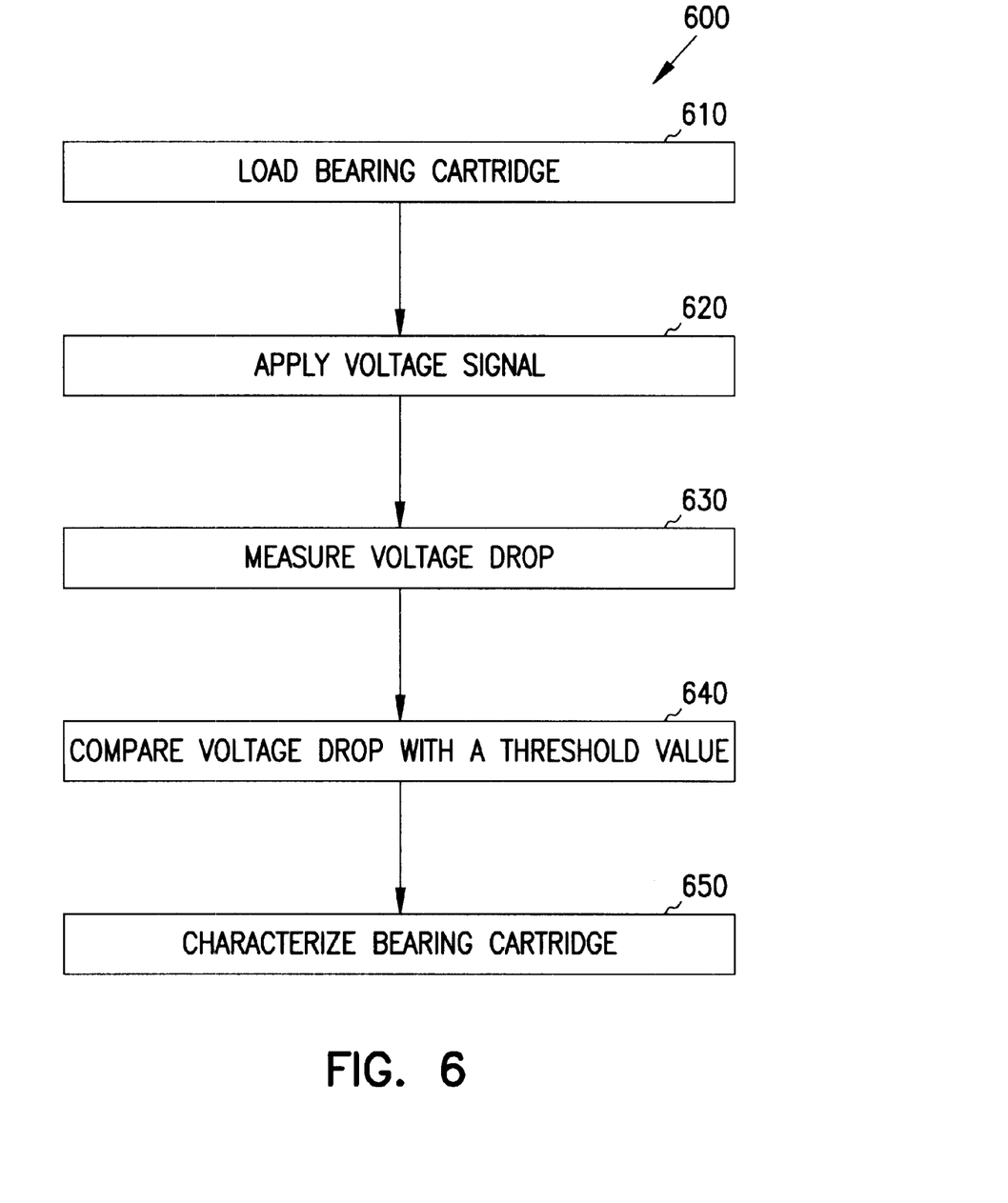
FIG. 6 is a flow diagram of a method of characterizing a bearing cartridge according to the present invention.

FIG. 6 is a flow diagram illustrating a method for characterizing a bearing cartridge based on a preload applied to the bearing cartridge in a disc drive, to increase disc drive yield rates and reduce seeking and settling problems. In this example embodiment shown in FIG. 6, the method 600 begins with the step 610 of loading the bearing cartridge on to a test fixture including a disc drive base and a voice coil motor-shaft-actuator assembly such that the voice coil motor-shaft-bearing cartridge-actuator assembly is rotatably attached to the base.

Step 620 includes applying a voltage signal to the voice coil motor to induce a steady swing in the shaft-bearing cartridge-actuator assembly that simulates a seek operation in the disc drive. In some embodiments, the steady swing is a swing that produces a constant velocity swing in the actuator arm. In some embodiments, the steady swing is a swing that produces constant acceleration or deceleration in the actuator arm. In some embodiment, the steady swing in the actuator arm occurs when the applied voltage signal reaches a steady state. In some embodiments, seek can include seeking data across a predetermined number of tracks. Also, the seek operation can be long enough to produce a steady swing in the shaft-bearing cartridge-actuator assembly. In some embodiments, applying the voltage signal includes applying a 1 Hz square pulse of 2 volts. In some embodiments, applying the voltage signal includes applying the voltage signal for a predetermined number of times to the voice coil motor such that the voltage signal applied during each of the predetermined number of times induces a steady swing in the actuator assembly. In some embodiments, the predetermined number of times is greater than or equal to 10.

Step 630 includes measuring a voltage drop that occurs across the bearing cartridge during the steady swing of the actuator assembly to characterize the bearing cartridge based on the preload applied to the bearing cartridge. In some embodiments, measuring the voltage drop includes measuring the voltage drop that occurs across the bearing cartridge during each of the predetermined number of times the voltage signal is applied to generate a steady swing in the actuator arm assembly. Further, measuring the voltage drop includes measuring highest and lowest voltage drops that occurs across the bearing cartridge during each of the predetermined number of times the voltage signal is applied to generate a steady swing in the actuator arm assembly.

In some embodiments, step 630 further includes computing an average voltage drop using the measured voltage drop that occurs across the bearing cartridge during each application of the voltage signal for the predetermined number of times, and then computing a standard deviation from the measured voltage drop that occurs during each application of the voltage signal for the predetermined number of times. Further, a largest and a smallest voltage drop that occurs across the bearing cartridge is determined using the measured highest and lowest voltage drops that occurs during each application of the voltage signal for the predetermined number of times.

In some embodiments, the method includes applying a DC voltage of $V_{in}$=3.2 Volts to a voltage driver circuit. The voltage drop across the bearing cartridge $$R_B\left(R_B = \frac{100V_o}{V_{in} - V_o}\right)$$

is then measured in terms of $V_o$=$IR_B$ (where I is the current flow into the voltage divider circuitry) for about 50 times and then the average voltage ($V_{o,avg}$), the smallest ($V_{o,low}$) and largest voltage ($V_{o,high}$) drops, and the standard deviation σ for $V_o$ are computed using the measured voltage drop for about 50 sweeps. The standard deviation σ is a measure of the average variation of all the sampled voltages from the average voltage. Where $R_B$ is the bearing cartridge resistance due to preload applied on the bearing cartridge. In one embodiment, the average dynamic bearing resistance $$R_{B,avg}\left(R_{B,avg} = \frac{100V_{o,avg}}{V_{in} - V_{o,avg}}\right)$$

for a low-preload bearing cartridge is normally larger than 60 Ω (or $V_{o,avg}$>1.2V, and the σ>0.2 for a low-preload cartridge). On the other hand, the $$R_{B,low}\left(R_{B,low} = \frac{100V_{o,low}}{V_{in} - V_{o,low}}\right) \text{ and } R_{B,high}\left(R_{B,high} = \frac{100V_{o,high}}{V_{in} - V_{o,high}}\right)$$

for a low-preload bearing cartridge are larger than 46 Ω (or $V_{o,low}$>1V) and 167 Ω (or $V_{o,high}$>2V), respectively.

Step 640 includes comparing the measured voltage drop with a predetermined threshold value. Step 650 includes characterizing the bearing cartridge based on the outcome of the comparison. In some embodiments, the characterizing the bearing cartridge includes comparing the computed average voltage drop to a predetermined average voltage drop and characterizing the bearing cartridge based on the outcome of the comparison. In some embodiments, the characterizing the bearing cartridge includes comparing the computed standard deviation to a predetermined standard deviation and characterizing the bearing cartridge based on the outcome of the comparison. In some embodiments, the characterizing the bearing cartridge includes comparing the determined largest and smallest voltage drops to a predetermined largest and smallest voltage drops and characterizing the bearing cartridge based on the outcome of the comparison. In some embodiments, characterizing the bearing cartridge includes, computing a bearing cartridge resistance from the measured voltage drop across the bearing cartridge and characterizing the bearing cartridge based on the computed bearing cartridge resistance.

In one example embodiment, the predetermined average voltage drop, the predetermined standard deviation, and the predetermined largest and smallest voltage drops and the criteria used to characterize the bearing cartridges are as outlined in the following table.

| CRITERIA | $V_{o,avg}$ | $V_{o,low}$ | $V_{o,high}$ | $\sigma$ |
|---|---|---|---|---|
| FAILED $V_o$ | >1.2 V | >1 V | >2 V | >0.2 |
| FAILED $R_B$ | $R_{B,avg} > 60\Omega$ | $R_{B,low} > 46\Omega$ | $R_{B,high} > 167\Omega$ | |

Figure 7:
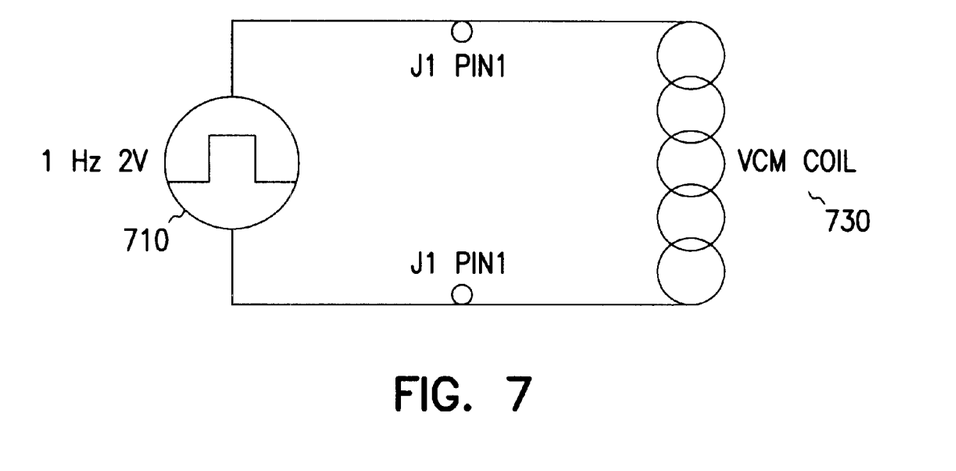
FIG. 7 illustrates one embodiment of applying a square pulse to the voice coil motor to induce a steady swing motion in the actuator arm.

Referring now to FIG. 7, there is shown one embodiment of a circuitry used to apply a 1 Hz square pulse of 2 volts 710 to the voice coil motor coil 730 to produce a steady swing in the actuator arm assembly. Also, shown in FIG. 7 are connectors J1 and J2 used in applying the square pulse 710 across the voice coil motor coil 730.

Figure 8:
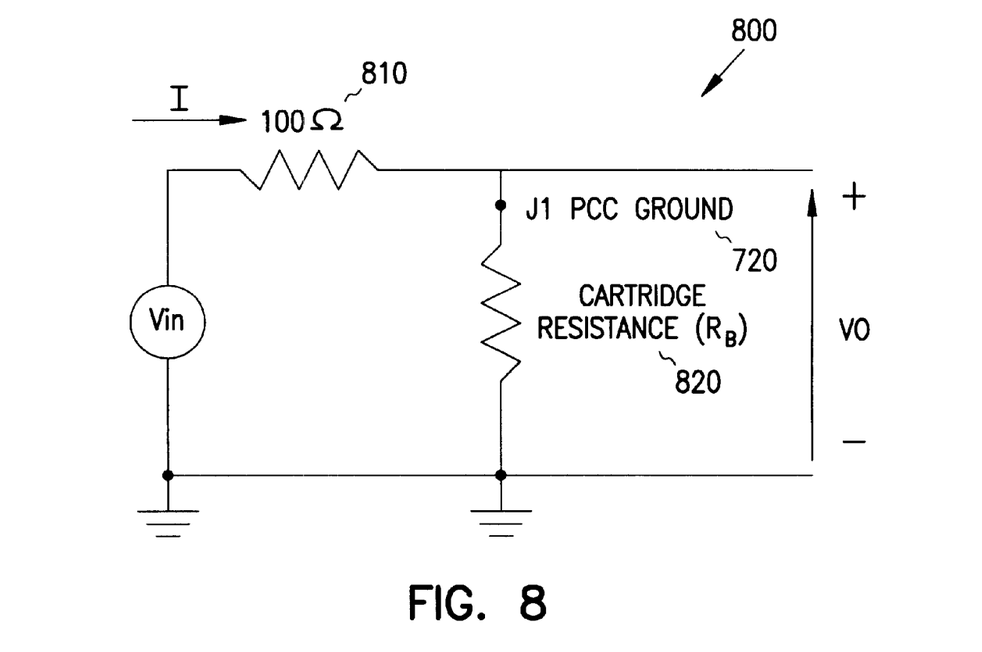
FIG. 8 illustrates one embodiment of forming a voltage divider circuit to measure bearing cartridge resistance.

Referring now to FIG. 8, there is shown one embodiment of a voltage divider circuit 800 used to measure a voltage drop across the bearing cartridge. The circuitry includes a series resistor of 100 Ω 810 along with the bearing cartridge resistance $R_B$ 820 in series to compute the bearing cartridge resistance $R_B$ 820. The bearing cartridge resistance $R_B$ 820 can be computed by using the following equation:

$$V_{in} = (100 \ \Omega + \text{the bearing cartridge resistance}) * I$$

Where $V_{in}$ is the applied voltage to the voltage divider circuitry 800, and I is current flowing in the voltage divider circuitry 800. After computing the bearing cartridge resistance $R_B$ 820, the voltage drop $V_o$ across the bearing cartridge resistance $R_B$ 820 can be computed using the following equation:

$$V_o = IR_B$$

Figure 9:
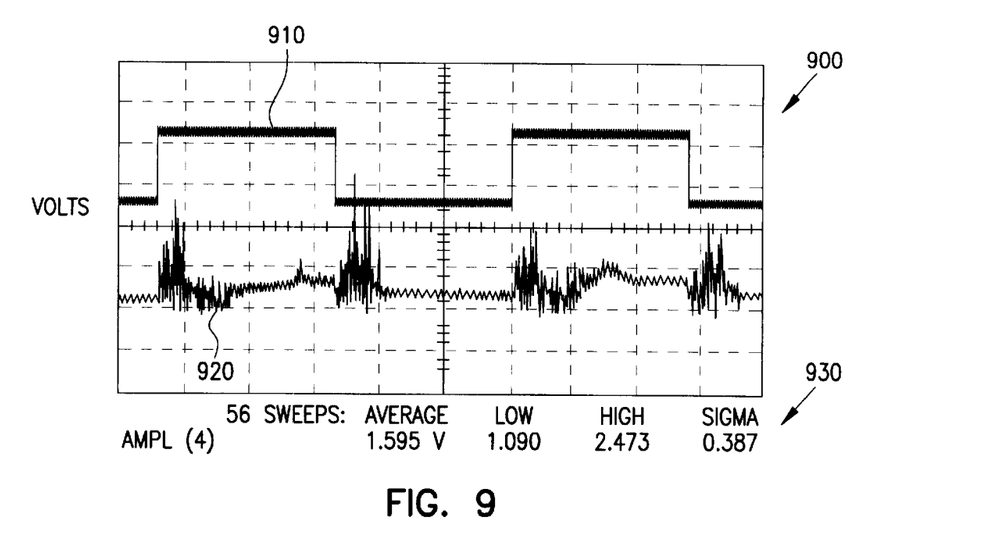
FIG. 9 illustrates a continuous sweep of applied voltage signals versus the measured voltage drops when using a low-preload bearing cartridge.

Referring now to FIG. 9, there is shown a graph 900 of a continuous sweep of voltage signals 910 applied to a voice coil motor to induce a steady swing in an actuator assembly versus the respective measured voltage drops 920 across a bearing cartridge during the steady swing when using a low-preload bearing cartridge. In some embodiments, the continuous sweep includes applying the voltage signal for a predetermined number of times to the voice coil motor. In some embodiments, the predetermined number of times is greater than 10. Also, shown in FIG. 9 is a table 930 showing the measured average amplitude voltage drop, amplitude of low voltage drop, amplitude of high voltage drop across the bearing cartridge, and a computed standard deviation for amplitude of voltage drop across the bearing cartridge obtained during a continuous sweep of 56 voltage signals applied across the voice coil motor, to produce the steady swing in the actuator assembly including the low-preload bearing cartridge.

Figure 10:
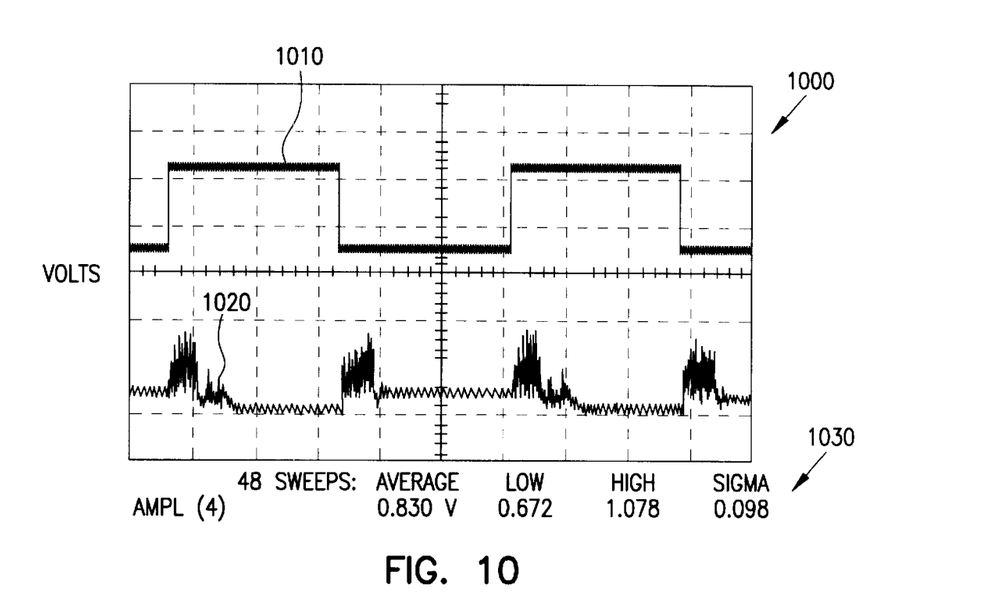
FIG. 10 illustrates a continuous sweep of applied voltage signals versus the measured voltage drop when using a normal bearing cartridge.

Referring now to FIG. 10, there is shown a graph 1000 of a continuous sweep of voltage signals 1010 applied to a voice coil motor to induce a steady swing in an actuator assembly versus the respective measured voltage drops 1020 across a bearing cartridge during the steady swing when using a bearing cartridge having normal preload. It can be seen from graphs 920 and 1020 that there is a significant variation in the voltage drop occurred across the bearing cartridge including a low-preload bearing cartridge when compared with the bearing cartridge having normal preload, respectively. Also, shown in FIG. 10 is a table 1030 showing the measured average amplitude voltage drop, amplitude of low voltage drop, amplitude of high voltage drop across the bearing cartridge, and a computed standard deviation for voltage drop amplitude across the bearing cartridge obtained during a continuous sweep of 56 voltage signal applied across the voice coil motor coil during the steady swing of the actuator arm assembly including the bearing cartridge having normal preload.

Figure 11:
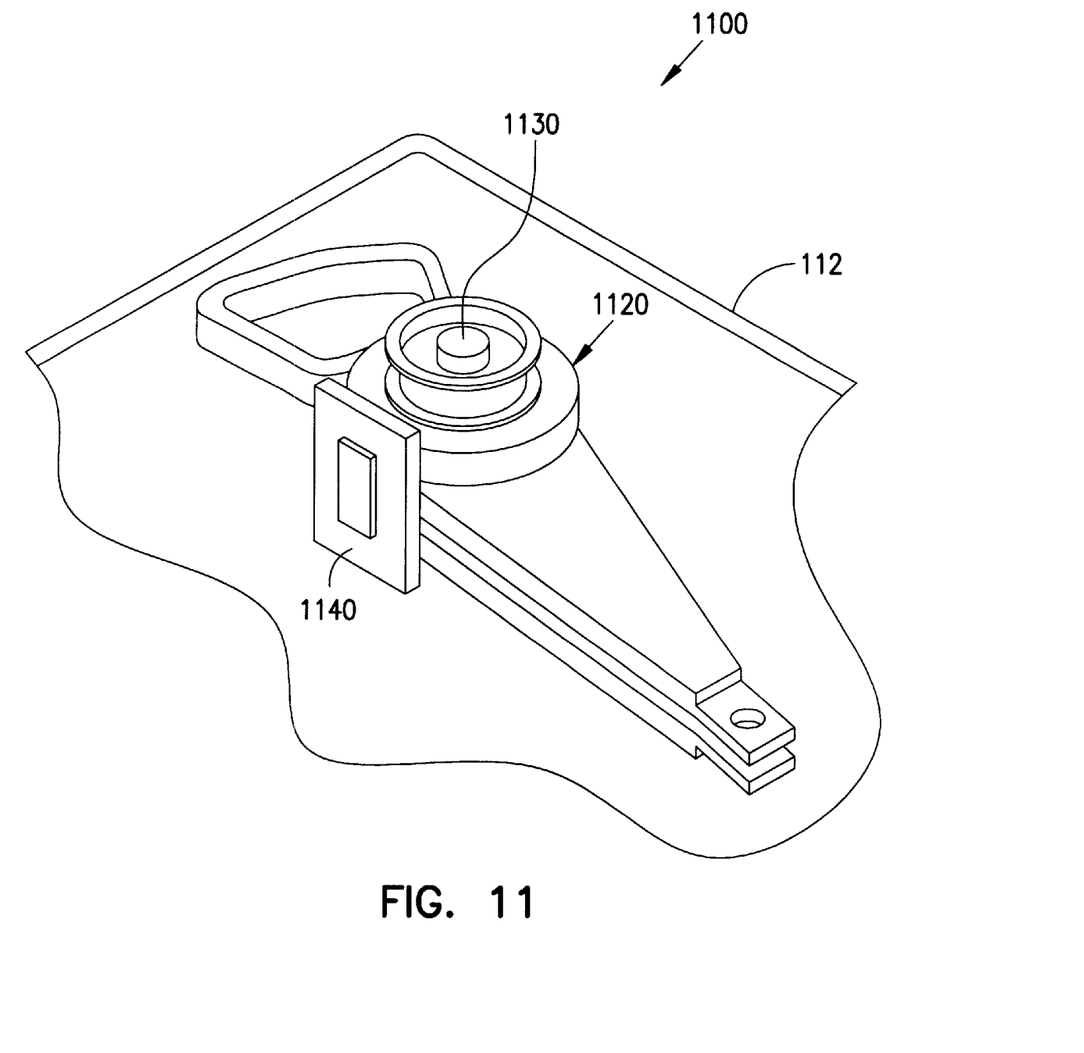
FIG. 11 illustrates one embodiment of a test fixture used in characterizing a bearing cartridge according to the present invention.

Referring now to FIG. 11, there is shown one example embodiment of a test fixture 1100 used in characterizing a bearing cartridge according to the present invention. The test fixture 1100 includes a base 112 of the disc drive shown in FIG. 1. In the example embodiment, shown in FIG. 11 the test fixture 1100 further includes an E-block assembly 1120 rotatably attached to the base 112. In some embodiments, E-block assembly includes a voice coil motor-shaft-actuator assembly. Further, the test fixture 1100 includes a bearing cartridge whose preload has to be characterized is disposed rotatably between the shaft and the actuator assembly. Also, the test fixture 1100 includes a voice coil motor circuitry 1140 to apply a voltage signal to the voice coil motor to induce a steady swing in the voice coil motor-shaft-bearing cartridge-actuator assembly 1130. The test fixture 1100 can also include a voltage divider circuit to measure a voltage drop that occurs across the bearing cartridge during the steady swing to characterize the bearing cartridge based on the preload applied to the bearing cartridge according to the present invention.

The voltage divider circuit can further include a comparator to compare the measured voltage drop to a predetermined threshold value to characterize the bearing cartridge based on the outcome of the comparison by the comparator. In some embodiments, the voltage signal applied by the voice coil motor circuitry is a 1 Hz square pulse of 2 volts.

In some embodiments, the voice coil motor circuitry applies the voltage signal for a predetermined number of times to the voice coil motor to induce a steady swing in the actuator assembly. The voltage divider circuit further measures the voltage drop across the bearing cartridge during each of the predetermined number of times the voltage signal is applied to induce the steady swing in the actuator assembly. Also, the voltage divider circuit measures highest and lowest voltage drops across the bearing cartridge during each of the predetermined number of times the voltage signal is applied to the voice coil motor. In some embodiments, the voltage divider circuit further includes an analyzer to compute an average voltage drop, a standard deviation, and largest and smallest voltage drops using the measured voltage drop that occurs during each application of the voltage signal for the predetermined of times. The comparator further compares the computed average voltage drop, the computed standard deviation, and the largest and smallest voltage drops to a predetermined average voltage drop, a predetermined standard deviation, and predetermined largest and smallest voltage drops, respectively, to characterize the bearing cartridge based on the preload applied to the bearing cartridge.

Figure 12:
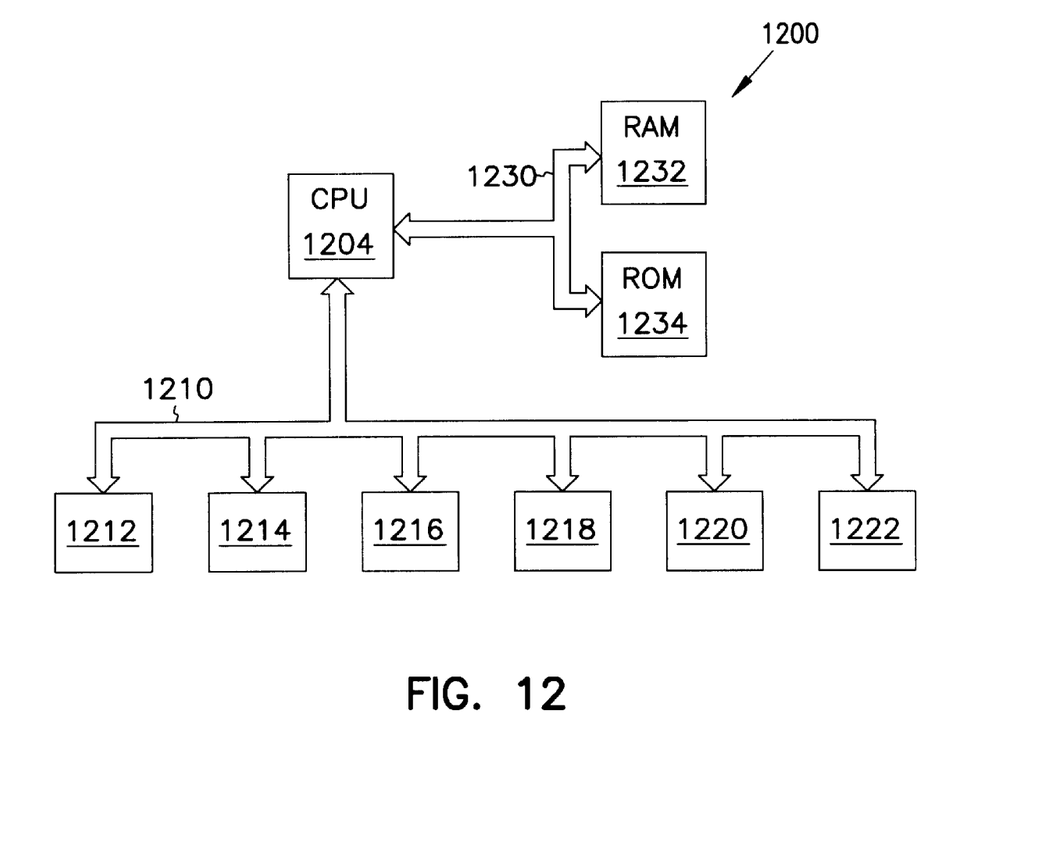
FIG. 12 is a schematic view of a computer system.

FIG. 12 is a schematic view of a computer system. Advantageously, the invention is well suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system may also include an input/output bus 1210 and several peripheral devices, such as 1212, 1214, 1216, 1218, 1220, and 1222 that may be attached to the input output bus 1210. Peripheral devices may include hard disc drives, magneto-optical drives, floppy disc drives, monitors, keyboards and other such peripherals. Any type of disc drive may include a bearing cartridge characterized according to the teaching of the present invention.

CONCLUSION

In conclusion, a method for characterizing a bearing cartridge based on a preload applied to the bearing cartridge in a disc drive increases disc drive yield rates and reduces seeking and settling problems. In this example embodiment shown in FIG. 6, the method 600 begins with the step 610 of loading the bearing cartridge on to a base and to an actuator such that the actuator is rotatably attached to the base by the bearing cartridge.

Step 620 includes inducing a steady swing in the actuator. In some embodiments, the steady swing is induced by applying a voltage signal to a voice coil motor operatively connected to the actuator. In some embodiments, applying the voltage signal includes applying a 1 Hz square pulse of 2 volts. In some embodiments, applying the voltage signal includes applying the voltage signal for a predetermined number of times on to the voice coil motor such that the voltage signal applied during each of the predetermined number of times induces a steady swing in the actuator assembly. In some embodiments, the predetermined number of times is greater than or equal to 10.

Step 630 includes measuring a voltage drop that occurs across the bearing cartridge during the steady swing of the actuator to characterize the bearing cartridge based on the preload applied to the bearing cartridge. In some embodiments, measuring the voltage drop includes measuring the voltage drop that occurs across the bearing cartridge during each of the predetermined number of times the voltage signal is applied to generate a steady swing in the actuator. Further, measuring the voltage drop includes measuring highest and lowest voltage drops occurred across the bearing cartridge during each of the predetermined number of times the voltage signal is applied to generate a steady swing in the actuator.

In some embodiments, step 630 further includes computing an average voltage drop using the measured voltage drop that occurs during each application of the voltage signal for the predetermined number of times, and then computing a standard deviation from the measured voltage drop that occurs during each application of the voltage signal for the predetermined number of times. Further, determining a largest and a smallest voltage drop that occurs across the bearing cartridge using the measured highest and lowest voltage drops that occurs during each application of the voltage signal for the predetermined number of times.

Step 640 includes comparing the measured voltage drop with a predetermined threshold value. Step 650 includes characterizing the bearing cartridge based on the outcome of the comparison. In some embodiments, the characterizing the bearing cartridge includes comparing the computed average voltage drop to a predetermined average voltage drop and characterizing the bearing cartridge based on the outcome of the comparison. In some embodiments, the characterizing the bearing cartridge includes comparing the computed standard deviation to a predetermined standard deviation and characterizing the bearing cartridge based on the outcome of the comparison. In some embodiments, the characterizing the bearing cartridge includes comparing the determined largest and smallest voltage drops to a predetermined largest and smallest voltage drops and characterizing the bearing cartridge based on the outcome of the comparison.

Also discussed is a test fixture 1100 that includes a base 112, a voice coil motor-shaft-actuator assembly 1120, and a bearing cartridge disposed between the shaft and the actuator assembly. The voice coil motor-shaft-bearing cartridge-actuator assembly 1130 is rotatably attached to the base 112. The test fixture 1100 also includes voice coil motor circuitry 1140 to apply a voltage signal to the voice coil motor to induce a steady swing of the actuator assembly. The test fixture 1100 further includes a voltage divider circuitry to measure a voltage drop that occurs across the bearing cartridge during the steady swing to characterize the bearing cartridge based on the preload applied to the bearing cartridge to reduce seeking and settling problems during a seek operation and to increase disc drive yield rates during manufacturing.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. (Once Amended) A method of characterizing a bearing cartridge for use in a disc drive based on a preload applied to the bearing cartridge, comprising steps of:
   (a) mounting the bearing cartridge to a base and an actuator such that the actuator is rotatably attached to the base by the bearing cartridge;
   (b) inducing a steady swing in the actuator to simulate a seek operation of the disc drive;
   (c) applying a voltage to a voltage divider that includes a bearing cartridge;
   (d) measuring a voltage drop that occurs across the bearing cartridge during the steady swing of the actuator to characterize the bearing cartridge based on a preload applied to the bearing cartridge; and
   (e) characterizing the bearing cartridge based on the measured voltage drop.

2. The method of claim 1, in which a voice coil motor is operatively connected to the actuator, and wherein in step (b) the steady swing of the actuator is induced by performing a step of:
   (b)(i) applying a voltage signal to the voice coil motor.

3. The method of claim 2, wherein in step (b)(i) the voltage signal comprises a 1 Hz square pulse of 2 volts.

4. (Once Amended) The method of claim 3, wherein the measuring step (d) further comprises steps of:

(d) (i) measuring the voltage drop that occurs across the bearing cartridge during each of the predetermined number of times the voltage signal is applied to induce the steady swing in the actuator arm assembly; and (d) (ii) measuring highest and lowest voltage drops across the bearing cartridge during each of the predetermined number of times the voltage signal is applied to induce the steady swing in the actuator arm assembly.

5. (Once Amended) The method of claim 4, wherein the measuring step (d) further comprises steps of:

(d) (iii) computing an average voltage drop using the measured occurred voltage drop during each application of the voltage signal for the predetermined number of times;

(d) (iv) computing a standard deviation using the measured voltage drop that occurs during each application of the voltage signal for the predetermined number of times; and (d) (v) determining a largest and a smallest voltage drop across the bearing cartridge using the measured highest and lowest voltage drops during each of the predetermined number of times.

6. (Once Amended) The method of claim 5, wherein characterizing step (e) further comprises steps of:

(f) comparing the computed average voltage drop to a predetermined average voltage drop; and (e) (i) characterizing the bearing cartridge based on the outcome of the comparison.

7. (Once Amended) The method of claim 6, wherein the bearing cartridge characterizing step (e) further comprises steps of:

(f) (i) comparing the computed standard deviation to a predetermined standard deviation; and (e) (ii) characterizing the bearing cartridge based on the outcome of the comparison.

8. (Once Amended) The method of claim 7, wherein the bearing cartridge characterizing step (e) further comprises steps of:

(f) (ii) comparing the determined largest and smallest voltage drops to a predetermined largest and smallest voltage drops; and (e) (iii) characterizing the bearing cartridge based on the outcome of the comparison.

9. (Once Amended) The method of claim 8, further comprising steps of:

(g) computing a bearing cartridge resistance using the measured voltage drop across the bearing cartridge; and (e) (iv) characterizing the bearing cartridge based on the computed bearing cartridge resistance.

10. The method of claim 2, wherein in step (b)(i) the voltage signal is applied a predetermined number of times to the voice coil motor such that the voltage signal applied during each of the predetermined number of times induces the steady swing in the actuator.

11. The method of claim 10, wherein the predetermined number of times is greater than or equal to 10.

12. A test fixture, comprising:

a base;

a voice coil motor-shaft-actuator assembly;

a preloaded bearing cartridge disposed in the voice coil motor-shaft-actuator assembly such that it is rotatably attached to the base;

voice coil motor circuitry to apply a voltage signal to the voice coil motor to induce a steady swing in the voice coil motor-shaft-bearing cartridge-actuator assembly; and a voltage divider circuit to measure a voltage drop that occurs across the bearing cartridge during the steady swing of the actuator assembly to characterize the bearing cartridge based on a preload applied to the bearing cartridge.

13. The test fixture of claim 12, wherein the voice coil motor circuitry further comprises:

a comparator to compare the measured voltage drop to a predetermined threshold value to characterize the bearing cartridge.

14. The test fixture of claim 12, wherein the applied voltage signal comprises:

a 1 Hz square pulse of 2 volts.

15. The test fixture of claim 12, wherein the voice coil motor circuitry is configured to apply the voltage signal for a predetermined number of times to the voice coil motor to induce a steady swing in the actuator assembly.

16. The test fixture of claim 15, wherein the voltage divider circuitry is configured to measure the voltage drop across the bearing cartridge during each of the predetermined number of times the voltage signal is applied to induce the steady swing in the actuator arm assembly, and also to further measure highest and lowest voltage drops across the bearing cartridge during each of the predetermined number of times the voltage signal is applied to the voice coil motor to induce the steady swing.

17. The test fixture of claim 16, wherein the voltage divider circuitry further comprises:

an analyzer to compute an average voltage drop, a standard deviation, and largest and smallest voltage drops using the measured voltage drop that occurs during each application of the voltage signal for the predetermined of times.

18. The test fixture of claim 17, wherein the comparator further compares the computed average voltage drop, the computed standard deviation, and the largest and smallest voltage drops to a predetermined average voltage drop, a predetermined standard deviation, and predetermined largest and smallest voltage drops, respectively, to characterize the bearing cartridge based on the preload applied to the bearing cartridge.

19. The test fixture of claim 17, wherein the analyzer computes a bearing cartridge resistance from the measured voltage drop to characterize the bearing cartridge based on a preload applied to the bearing cartridge.

20. (Once Amended) A test system, comprising:

a base;

an actuator;

a preloaded bearing cartridge disposed in the actuator such that it is rotatably attached to the base; and means for characterizing the bearing cartridge based on an electrical resistance of the bearing cartridge.

* * * * *